United States Patent [19]
Mitsui et al.

[11] Patent Number: 4,779,709
[45] Date of Patent: Oct. 25, 1988

[54] APPARATUS FOR CONTROLLING AC ELEVATORS

[75] Inventors: Nobuo Mitsui, Katsuta; Yoshio Sakai, Naka; Masao Nakazato; Mitsuyuki Honbu, both of Katsuta; Shigeta Ueda, Hitachi; Seiya Shima, Katsuta; Katsu Komuro, Mito; Takeki Ando, Naka; Akiteru Ueda, Toukai; Kazuhiko Sasaki; Toshiaki Kurosawa, both of Katsuta, all of Japan

[73] Assignee: Hitachi, Ltd., Tokyo, Japan

[21] Appl. No.: 899,640

[22] Filed: Aug. 25, 1986

[30] Foreign Application Priority Data

Sep. 2, 1985 [JP] Japan .................................. 60-191925
Jan. 8, 1986 [JP] Japan ...................................... 61-607

[51] Int. Cl.⁴ .................................................. B66B 1/30
[52] U.S. Cl. ........................................ 187/119; 363/47
[58] Field of Search ................ 187/119; 318/727, 729; 363/34, 39, 37, 47

[56] References Cited

U.S. PATENT DOCUMENTS

| | | | |
|---|---|---|---|
| 3,395,327 | 7/1968 | Kaiser et al. | 363/39 X |
| 4,130,861 | 12/1978 | La Forest | 363/39 |
| 4,183,081 | 1/1980 | Cutler et al. | 363/37 X |
| 4,188,663 | 2/1980 | Okawa et al. | 363/37 X |
| 4,338,559 | 7/1982 | Blaschke et al. | 363/47 X |
| 4,361,793 | 11/1982 | Nordell | 318/729 |
| 4,475,631 | 10/1984 | Nomura | 187/119 |
| 4,479,565 | 10/1984 | Nomura | 187/119 |

*Primary Examiner*—William M. Shoop, Jr.
*Assistant Examiner*—W. E. Duncanson, Jr.
*Attorney, Agent, or Firm*—Antonelli, Terry & Wands

[57] ABSTRACT

An elevator control apparatus comprises an inverter device for supplying an induction motor for driving an elevator cage with AC electric power of variable voltage and frequencies and control equipment for controlling the output voltage and frequencies of the inverter device in response to signals produced in floors served by the elevator and in an elevator cage. The inverter device is constructed by a converter unit for converting AC electric power to DC electric power, at the input end of which a capacitor is connected in parallel with an AC electric source, an inverter unit for inverting the DC electric power converted in the converter unit into AC electric power, at the output end of which a capacitor is connected in parallel with an induction motor for driving the elevator cage and a DC reactor connected between the converter unit and the inverter unit.

The thus constructed elevator control apparatus does not cause interference in electric appliances such as audio equipment, computer etc. existing within a building in which the elevator is installed.

7 Claims, 7 Drawing Sheets

APPARATUS FOR CONTROLLING AC ELEVATORS

BACKGROUND OF THE INVENTION

1. Field of The Invention

The present invention relates to an apparatus for controlling AC elevators, and more specifically to a control apparatus for AC elevators, in which an induction motor for driving an elevator cage is controlled by using a frequency converter.

2. Description of The Related Art

Recently, as disclosed in, for example, Japanese Utility Model Laid-open Publication No. 56-132274, an elevator control system has been developed, according to which an induction motor for driving an elevator cage is controlled by using a frequency converter (called an inverter device, hereinafter). Such an inverter device usually has a converter unit capable of converting AC electric power to DC electric power, a smoothing capacitor connected across output terminals of the converter unit for smoothing the output voltage of the converter unit and an inverter unit connected to the converter unit and inverting the converted DC electric power into AC electric power. The AC electric power of the constant frequency, which is supplied to the inverter device from a commercial electric source, is converted to the AC electric power of the variable frequencies, which is fed to the induction motor.

With this, the induction motor can be very effectively controlled from the start of the elevator to the stop thereof, by varying the output voltage and frequency of the inverter device. Consequently, the consumption of the electric power is much improved, and in addition the high accuracy in the control can be attained.

As is well known, voltage and current controlled by the inverter device include a large quantity of and various kinds of harmonics, which cause noise. Especially, in the case of elevator facilities, the inverter device and various kinds of control equipment are usually accommodated in a unitary control cubicle, and therefore there is the possibility that noise generated in the inverter device easily enters the control equipment and is emitted everywhere inside a building through a tail code which connects the elevator cage and the control equipment and communicates signals and electric power therebetween, or through wirings which are provided within the building for signal communication between the control equipment and devices such as hall call button switches and indicators equipped in elevator halls of floors.

The emitted noise causes interference in other electric appliances, such as audio appliances, computors and the like, existing within the building. This problem is more serious, because the elevator usually works near office rooms or living rooms.

SUMMARY OF THE INVENTION

An object of the present invention is to provide an apparatus for controlling AC elevators, by which the generation of the electromagnetic noise can be suppressed at the very low level.

According to a feature of the present invention, an apparatus for controlling an AC elevator comprises a converter unit for converting AC electric power to DC electric power, at the input end of which a capacitor is connected in parallel with an AC electric source, which supplies the converter unit with the AC electric power, an inverter unit for inverting the DC electric power converted in the converter unit into AC electric power, at the output end of which a capacitor is connected in parallel with an induction motor for driving an elevator cage, a DC reactor connected between the converter unit and the inverter unit, and means for controlling the converter unit and the inverter unit in response to signals produced in floors served by the elevator and in the elevator cage.

According to the feature mentioned above, the waveforms of both the input side and the output side of an inverter device are much improved, and therefore the magnitude of electromagnetic noise waves becomes remarkably low.

However, in an inverter device as described above, the occurrence of noise may also affect the reliable operation of the inverter device itself, due to the DC reactor provided between the converter unit and the inverter unit. Then, another feature of the present invention is in the generation of control signals (gate or base signals) of the converter unit and/or the inverter unit in order to secure the reliable operation of the inverter device, and hence the elevator.

Other objects and features of the present invention will become apparent upon reading the specification and inspection of the drawings and will be particularly pointed out in the claims.

DESCRIPTION OF THE PREFERRED EMBODIMENTS

Before explaining the present invention, the description will be made of an prior art and its problems, referring to FIGS. 1 to 3.

Figure 1:
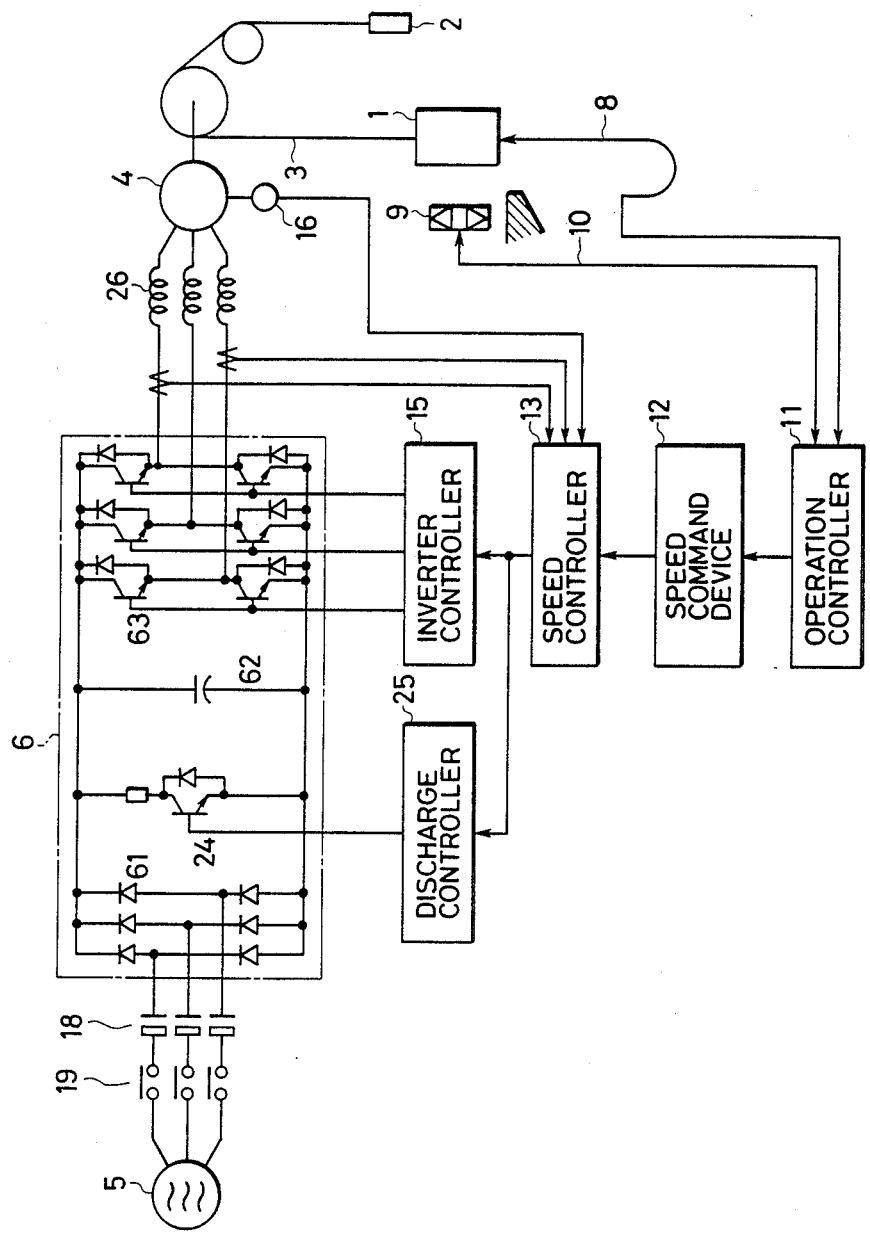
FIG. 1 schematically shows an elevator control apparatus according to a prior art.

FIG. 1 schematically shows the structure of a typical one of examples of a prior art elevator control system. In the figure, an elevator cage 1 is coupled with a balance weight 2 through a rope 3, which is driven by an induction motor 4. The motor 4 is supplied with AC electric power from an AC power source 5 through an inverter device 6. The inverter device 6 comprises a converter unit 61 which converts AC electric power to DC electric power, a smoothing capacitor 62 and an inverter unit 63 which inverts the converted DC electric power into AC electric power. Across terminals of the converter unit 61, there is provided a discharging circuit 24, the conduction of which is controlled by a discharge controller 25. The discharging circuit 24 serves to protect the capacitor 62 from the over-charge which occurs during the regenerative operation of the elevator, i.e., the no load up travel or the full load down travel of the elevator cage 1, because the converter unit 61 has no regenerative function.

A control apparatus for the inverter device 6 comprises an operation controller 11, a speed command device 12, a speed controller 13 and an inverter controller 15. The operation controller 11 manages the service of the elevator on the basis of hall call signals which are sent through a wiring 10 from a call button switch 9 provided in a hall of a floor and cage call signals which are generated in the elevator cage 1 and sent through a tail code 8. The speed command device 12 produces a speed command in response to a signal from the operation controller 11. The speed controller 13 controls the travelling speed of the elevator cage 1 in accordance with the speed command from the speed command device 12. For that purpose, an actual speed signal and a current signal are also given to the speed controller 13 from a speed detector 16 and a current detector 17, respectively. The inverter controller 15 controls the inverter unit 63 on the basis of a signal from the speed controller 13. Further, reference numeral 18 denotes a control contactor which is maintained closed during the operation and reference numeral 19 a breaker which is opened at the emergency.

Figure 2:
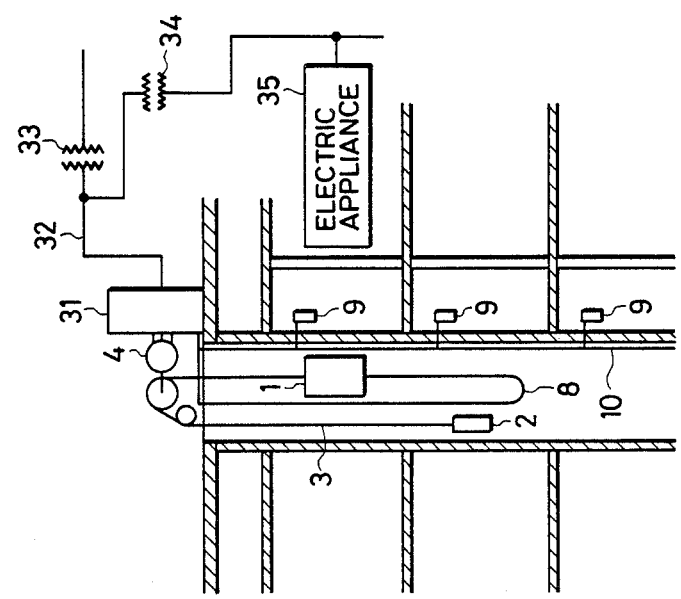
FIG. 2 roughly illustrates the way of installation of elevator facilities within a building.

FIG. 2 shows an example of the arrangement of an elevator facilities within a building. In the figure, a control cubicle 31 closely accommodates the inverter device 6 as well as control equipment such as the device and controllers mentioned above. To the cubicle 31, electric power is supplied through a power line 32 from power equipment 33. Further, as described above, the tail code 8 is extended from the operation controller 11 in the cubicle 31 to the elevator cage 1, and moves up and down within an elevator duct with the elevator cage 1. Also, the wiring 10 is arranged within the elevator duct from the cubicle 31, and connects the operation controller 11 with the call button switches 9 provided in halls of every floors.

In the following will be discussed the influence of electromagnetic noise waves produced during the operation of the inverter device 6.

Figure 3A:
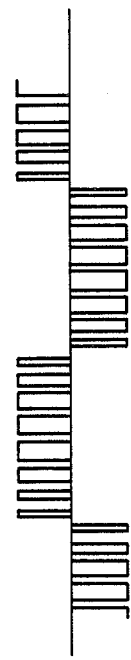
FIGS. 3(a) and 3(b) are explanatory drawings of the operation of the apparatus of FIG. 1.
Figure 3B:
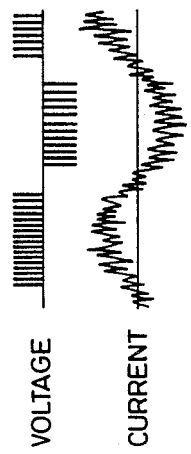

In FIG. 1, the inverter unit 63 of the inverter device 6 inverts the constant DC voltage appearing across the capacitor 62 into the AC voltage by the pulse width modulation (PWM) control. FIG. 3(a) shows the waveform of the voltage produced by the PWM control. The constant DC voltage is chopped with the high frequencies in such a manner that, when the chopped voltage pulses are smoothed, the smoothed voltage changes almost sinusoidally. As shown in FIG. 3(b), when such voltage is applied to the induction motor 4, the current of the sinusoidal waveform including harmonics flows through the motor 4.

Although the curent becomes like the sine wave due to reactors 26 inserted between the inverter unit 63 and the motor 4 and the reactance of the induction motor 4, the voltage applied to the motor 4 remains as the PWM-controlled pulse form and therefore includes harmonic ripples. Usually, in order to eliminate the ripples in the voltage, a smoothing capacitor is employed. If, however, such a capacitor is connected at the output end of the inverter unit 63 as shown in FIG. 1, the abrupt charging current flows into the capacitor, so that transistors of the inverter unit 63 are destroyed. Therefore, such a capacitor may not be utilized. Further, the reactance of the reactor 26 may not be made too large, because the voltage drop across the reactor 26 causes the insufficient input voltage of the motor 4.

In this way, since the inverter device 6 described above can not be equipped with sufficient countermeasures against harmonics, both output voltage and current include a large quantity of and various kinds of the harmonics. Because of these harmonics, harmonic noise is induced in control equipment which is accommodated in the cubicle 31 very closely to the inverter device 6. The noise generated in the cubicle 31 is emitted into the inside of the building through the tail code 8 and the wiring 10 connected to the control equipment. Especially, the tail code 8 effectively functions as an antenna for emitting the electromagnetic waves of noise.

On the other hand, also in the side of the converter unit 61, the current including a large amount of harmonics is generated by the rectifier operation thereof, since the current flows intermittently. Such harmonics induce the electromagnetic noise, too, which invades the control equipment and is emitted into the inside of the building through the tail code 8 and the wiring 10. In addition, the harmonic current is also transferred through the power line 32 and power equipment 33 and 34 to electric appliances 35, such as audio appliances, computers etc., within the building. The influence is very serious in the case where they are an information processing system or a medical-electronic equipment of the high sensitivity.

Figure 4:
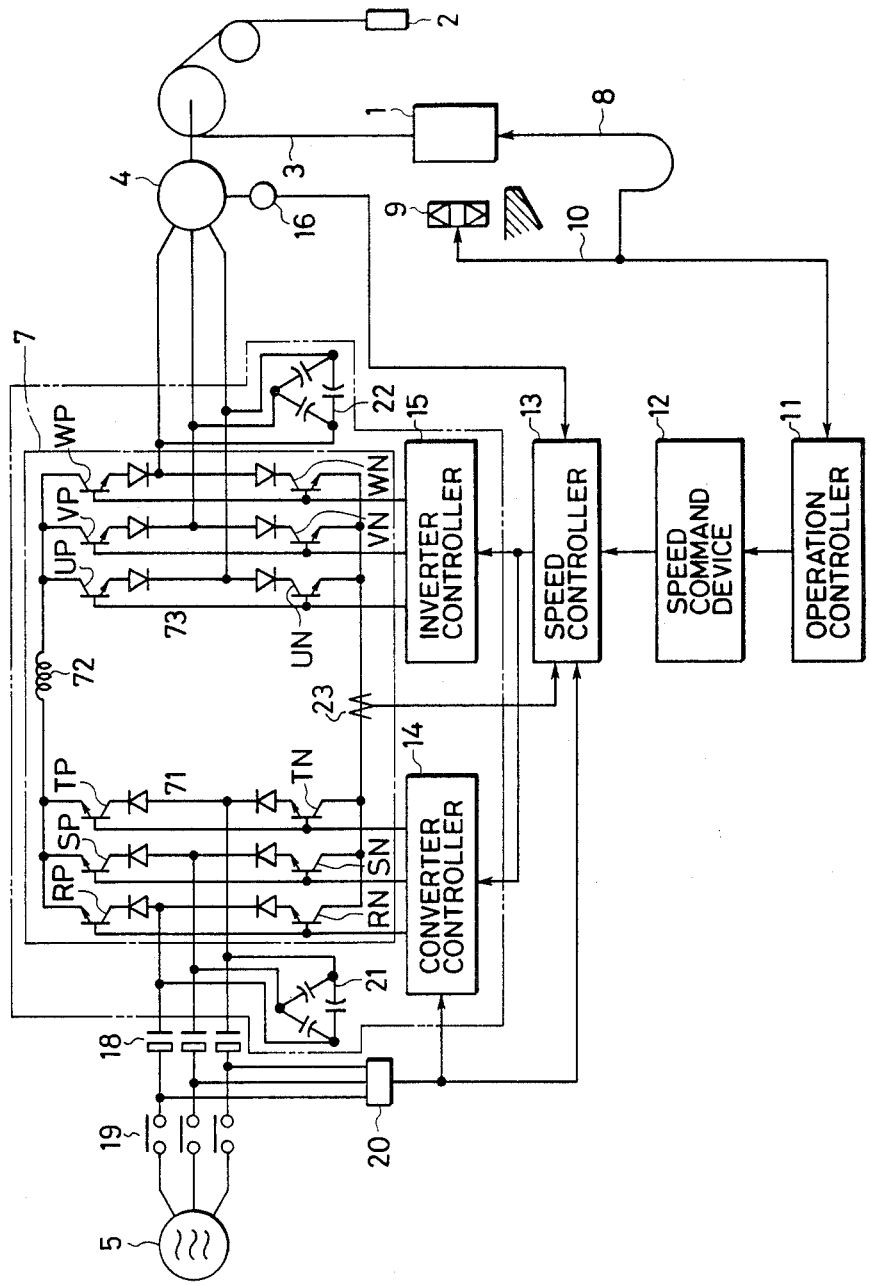
FIG. 4 schematically shows an elevator control apparatus according to an embodiment of the present invention.

Referring now to FIG. 4, the description will be made of an embodiment of the present invention. In the figure, like parts are denoted by the same reference numerals as in FIG. 1.

An inverter device 7 in the embodiment comprises a converter unit 71 and an inverter unit 73, which are connected through a DC reactor 72. The converter unit 71 of this embodiment comprises transistors RP, SP, TP, RN, SN and TN as switching elements. There is further provided a converter controller 14, which controls base signals of those transistors. Accordingly, the converter unit 71 can not only convert AC electric power into DC electric power, but also control the output voltage thereof. Further, smoothing capacitors 21 and 22 are provided at the input end of the converter unit 71 and the output end of the inverter unit 73, respectively.

In the figure, the speed controller 13 receives the speed command from the speed command device 12 and a speed feedback signal from the speed detector 16, and produces control signals to the converter controller 14 and the inverter controller 15 in accordance with the difference therebetween. The converter controller 14 produces base signals of the traniistors RP, SP, TP, RN, SN and TN on the basis of the control signal from the speed controller 13, and controls the output voltage of the converter unit 71 by means of the PWM control. Although this PWM control causes harmonics in the input side, i.e., in the AC side, of the converter unit 71, the input current of the AC side are smoothed by the capacitor 21, and therefore the waveform of the input current is much improved, compared with that in the case of FIG. 1.

Figure 5A:
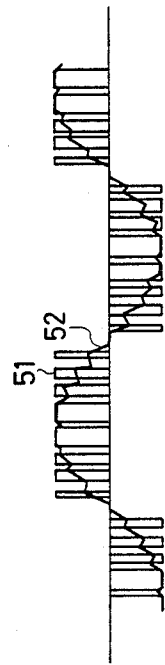
FIGS. 5(a) and 5(b) are explanatory drawings of the operation of the apparatus of FIG. 4.

The inverter unit 73, which comprises transistors UP, VP, WP, UN, VN and WN as switching elements, is controlled by the PWM, similarly to the inverter unit 63 of FIG. 1. As a result, the current which is supplied from the converter unit 71 is chopped with the high frequencies as shown by reference numeral 51 in FIG. 5(a). The pulse current is smoothed by the capacitor 22, which usually has the larger smoothing effect against the rippled current than the reactor 26 shown in FIG. 1. The thus obtained current has almost the sinusoidal waveform including a little harmonics, as shown by reference umeral 52 in FIG. 5(a) The voltage appearing across the capacitor 22 also has the sinusoidal waveform. A small quantity of harmonics included in the current can be smoothed by the reactance of the motor 4.

Figure 5B:
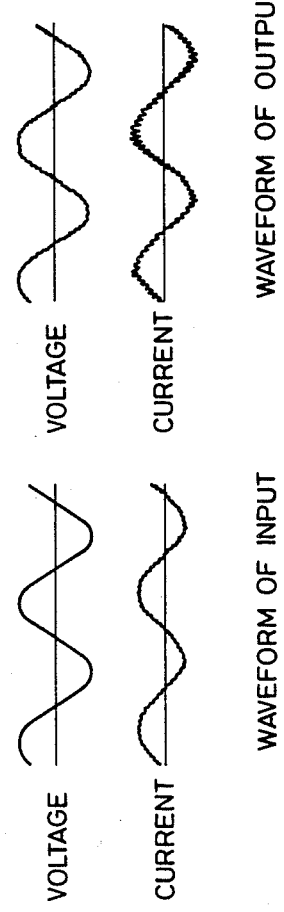

In this manner, according to this embodiment, the waveforms of the voltage and current, which are input to and output from the inverter device 7, can be made almost the sinusoidal wave, as shown in FIG. 5(b). Consequently, noise is generated very slightly, compared with the prior art as shown in FIG. 1. Further, it can be prevented by the reactor 72 that the charging current rushes into the capacitor 22, and therefore the transistors of the inverter unit 73 are not destroyed by the abrupt charging current.

As already described, the DC current supplied for the inverter unit 73 can be controlled by the converter unit 71. Accordingly, the relationship between the waveforms of the pulse current as shown by reference numeral 51 in FIG. 5(a) and the current 52 smoothed by the capacitor 22 can be always maintained in spite of the magnitude of the current. This fact means that the favorable output waveform can be obtained even when the elevator cage 1 travels at the low speed below its rated speed.

As mentioned above, the present invention is possible to remarkably reduce the harmonic noise generated in a main circuit formed by an AC source, the inverter device and the induction motor. The harmonic noise does not invade into the control equipment within the cubicle 31 by the electromagnetic induction, and therefore the inductive interference within the building can be prevented.

Figure 6:
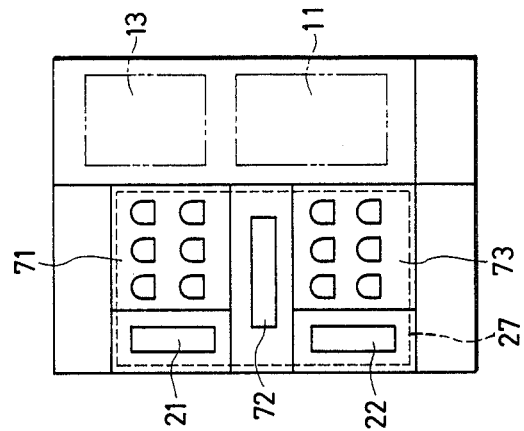
FIG. 6 shows an example of the manner of accommodating various devices and equipment in an elevator control cubicle.

If, when the equipment shown in FIG. 4 is installed in the cubicle 31, parts surrounded by a two-dotted chain line in the figure are shielded by conductive material, the effect of preventing the inductive interference is further enhanced. FIG. 6 shows an example thereof, in which major parts of the control equipment (only the operation controller 11 and the speed controller 13 are shown in FIG. 6) are collected at a certain appropriate location within the cubicle 31, and the capacitors 21, 22, the converter unit 71, the reactor 72 and the inverter unit 73 are separated from the control equipment by surrounding them as a whole with a metal plate 27 of the good conductivity. With this arrangement, the main circuit of the inverter device 7 can be electromagnetically shielded against the control equipment, and the invasion of electromagnetic noise waves into the control equipment can be prevented.

Figure 7:
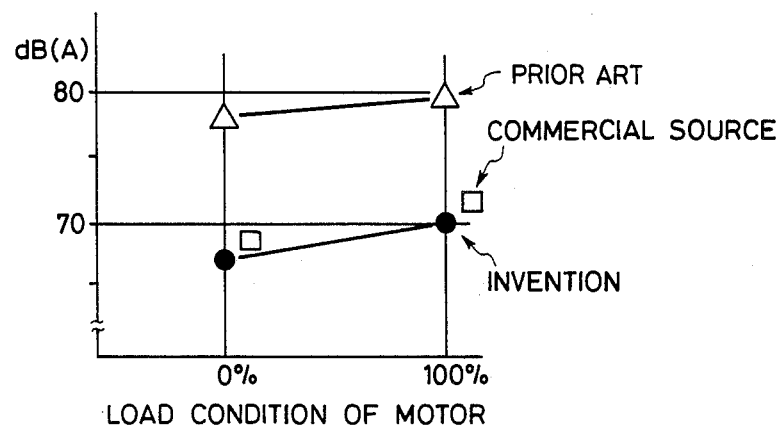
FIG. 7 is a diagram showing an example of the effects according to the present invention.

Moreover, as apparent from FIG. 5(b), since the waveforms of the voltage and current are improved, the sound noise made during the rotation of the motor 4 is remarkably reduced. As shown in FIG. 7, according to the present invention, the level of the sound noise has been reduced by about 10 dB over the whole load condition of the motor 4, compared with the prior art. This level is almost the same as the level of the sound noise made when the motor 4 operates under application of a commercial source, which has the almost perfect sinusoidal waveform.

Figure 8:
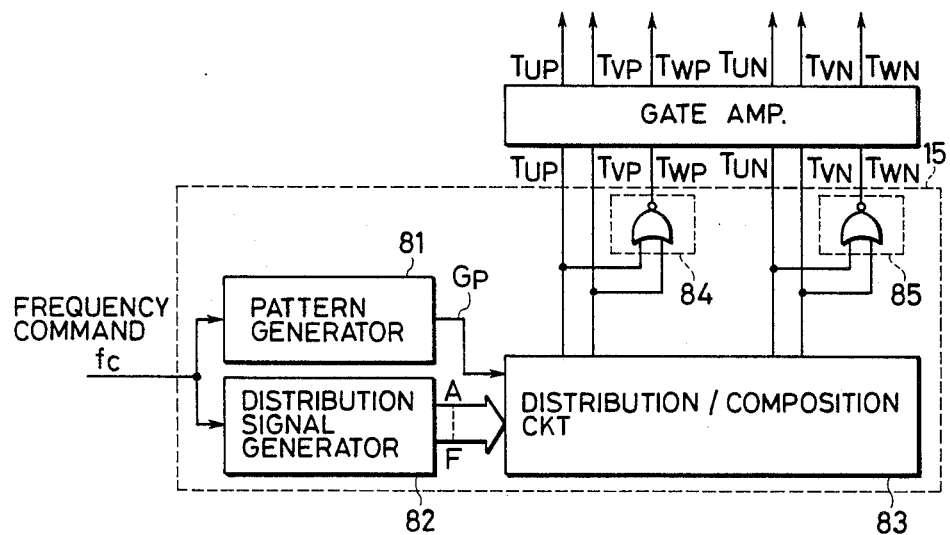
FIG. 8 schematically shows an inverter controller according to another embodiment of the present invention.
Figure 9:
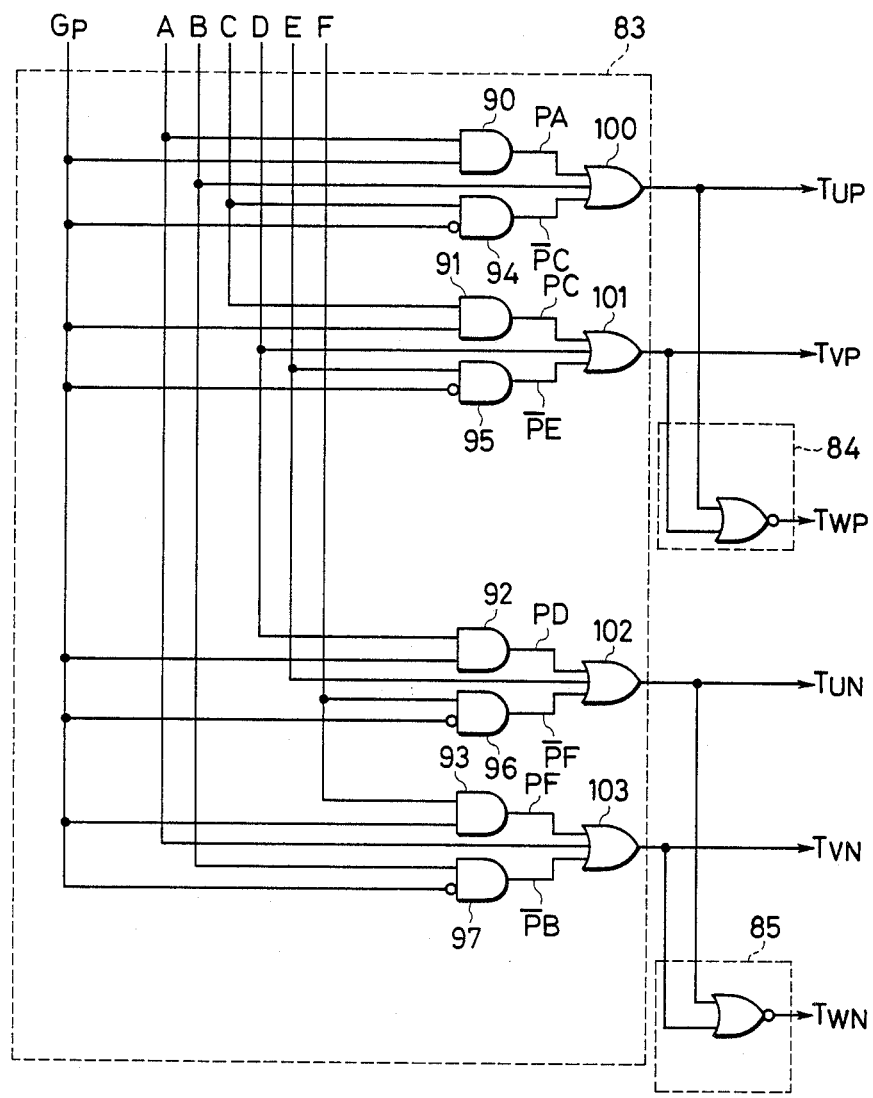
FIG. 9 shows the detailed structure of a distribution/composition circuit employed in the inverter controller of FIG. 8.
Figure 10:
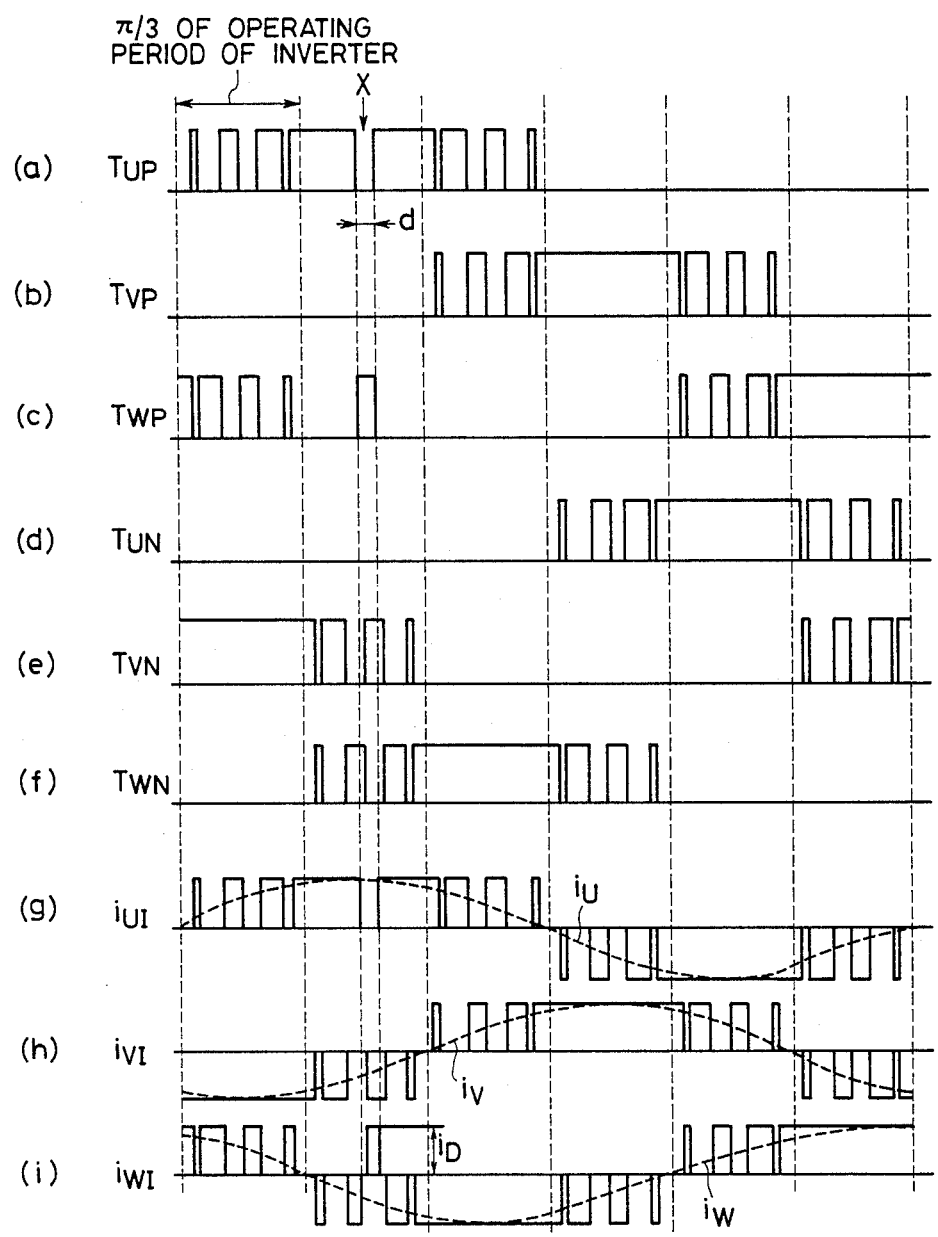
FIG. 10 is a diagram for explaining the operation of the inverter controller of FIG. 8.

The electromagnetic waves of noise affects not only the various kinds of external electric appliances, but also the control operation of the inverter device 7 itself. Therefore, the converter controller 14 and the inverter controller 15 must have a countermeasure for preventing the malfunction of the inverter device caused by the noise, in order to secure the reliable operation of the elevator. Referring next to FIGS. 8 to 10, the explanation will be done of such a countermeasure.

In the inverter device 7 of the type as described above, any one of the transistors UP, VP, WP, which form a group of the positive arms of the three phase bridge circuit (Gratz connection) and any one of the transistors UN, VN, WN, which form a group of the negative arms thereof are to be always in the conductive condition. Namely, the circuit of the DC source (the converter unit 71)—the reactor 72—one of the positive arms of the inverter unit 73—a load (the motor 4)—one of the negative arms of the inverter unit 73—the DC source has to be always closed during the operation of the inverter device 7. If, however, the base signal of a transistor to be conductive mistakenly disappears, the aforesaid closed circuit is opened. As a result, there is lost a loop (circuit) for circulating the energy stored in the reactor 72, which has the considerably large inductance, so that the high voltage is induced across the reactor 72 and the over-voltage is applied to a transistor of the opened arm, resulting in the breakdown of the transistor.

FIG. 8 shows an inverter controller 15 according to this embodiment, by which the occurence of the aforesaid inconvenience is prevented. In the figure, the control signal from the speed controller 13 is fed to the inverter controller 15 in the form of a frequency command $f_c$. In response to the frequency command $f_c$, a pattern generator 81 and a distribution signal generator 82 produced a PWM pattern signal $G_p$ and distribution signals A to F, respectively. The PWM pattern signal $G_p$ is repeated every 60 degree, which corresponds to a sixth of one cycle of the output current of the inverter unit 73. The distribution signals A to F have the phase difference of 60 degree in terms of the electric angle.

Receiving the pattern signal $G_p$ and the distribution signals A to F, a distribution/composition circuit 83 produces base signals $T_{UP}$, $T_{VP}$ and $T_{UN}$, $T_{VN}$, which are led to the base electrodes of the transistors UP, VP, UN and VN, respectively. Further, the base signals $T_{UP}$ and $T_{VP}$ are coupled to a NOR gate 84, whereby a base signal $T_{WP}$ to the transistor WP is formed, and similarly the base signals $T_{UN}$ and $T_{VN}$ are coupled to a NOR gate 85, whereby a base signal $T_{WN}$ to the transistor WN is formed.

FIG. 9 shows the detailed structure of the distribution/composition circuit 83. This circuit 83 consists of various kinds of logic gate circuits, i.e., AND gates 90 to 93, AND gates 94 to 97 having inverse input terminals and OR gates 100 to 103. Four sets of logical circuits, which produce the respective base signals, have the same combination of the logic gates, and only the combinations of input signals received thereby are different from one another.

In such a circuit, the pattern signal $G_p$ is ANDed in the AND gate 90 with the distribution signal A to form a signal PA. Further, an inverse of the pattern signal $G_p$ is ANDed in the AND gate 94 with the distribution signal C to form a signal PC. Both the signals PA and PC are ORed in the OR gate 100, whereby the base signal $T_{UP}$ is produced. The similar logical operation is applied to the production of the other base signals $T_{VP}$, $T_{UN}$ and $T_{VN}$. The base signals $T_{WP}$ and $T_{WN}$ are, as described above, obtained by NORing the base signals $T_{UP}$ and $T_{VP}$, and $T_{UN}$ and $T_{VN}$, respectively.

Referring to FIG. 10, the operation of this embodiment will be explained in the following. FIGS. 10(a) to 10(f) show the base signals $T_{UP}$, $T_{VP}$, $T_{WP}$, $T_{UN}$, $T_{VN}$, and $T_{WN}$, which are obtained in the above described manner. FIGS. 10(g) to 10(i) show the output currents $i_{UI}$, $i_{VI}$ and $i_{WI}$ of the inverter unit 73 (pulse-formed solid line) and the load currents $i_U$, $i_V$ and $i_W$ flowing through the motor 4 (sinusoidal broken line).

The transistors become conductive only when the corresponding base signals are high. Therefore, the output current $i_{UI}$ of the inverter unit 73 has the same conducting pattern as the signal pattern of the base signal $T_{UP}$ in its positive half cycle and the same conducting pattern as the signal pattern of the base signal $T_{UN}$ in its negative half cycle. The same is true of the relationship between the output currents $i_{VI}$ and $i_{WI}$ and the base signals $T_{VP}$, $T_{VN}$ and $T_{WP}$, $T_{WN}$. Such load currents are smoothed by the capacitor 22, so that the currents as shown by $i_U$, $i_V$ and $i_W$ in FIGS. 10(g) to 10(i) flow through the motor 4.

Here assuming that noise which occurs at a time point X affects the base signal $T_{UP}$ and, as a result, a slit of the width d appears in the signal $T_{UP}$. (cf. FIG. 10(a)) Namely, due to the noise, the base signal $T_{UP}$ is made zero for the duration d at the time point X, and therefore the transistor UP becomes nonconductive for this duration d. In response to the fact that the signal $T_{UP}$ becomes low, the base signal $T_{WP}$ becomes high by virtue of the NOR gate 84. (cf. FIG. 10(c)) In the normal operation, the signal $T_{WP}$ does not exist at the time point X. This base signal $T_{WP}$ renders the transistor WP conductive. Therefore, even if the transistor UP becomes nonconductive, the loop for circulating the energy stored in the reactor 72 is secured by the conduction of the transistor WP. Namely, any one of the transistors UP, VP and WP of the positive arms of the Gratz circuit can be always maintained conductive.

It will be easily understood from the circuit structure of FIG. 9 that, also in the case where the base signal $T_{VP}$ is affected by noise, the base signal $T_{WP}$ becomes high. Further, when either one of the transistors UN and VN of the negative arms is made nonconductive by noise, the transistor WN becomes conductive by the function of the NOR gate 85, so that the loop for circulating the energy stored in the reactor 72 is formed.

In this way, since, according to this embodiment, the discharge loop of the energy of the reactor 72 is always kept, the breakdown of the transistor by the over-voltage can be prevented. Moreover, since the base signals $T_{WP}$ and $T_{WN}$ are made by the NOR gates 84 and 85, such logical circuits for forming the base signals as those for the transistors UP, VP, UN and VN are unnecessary for the transistors WP and WN, so that the structure of the distribution/composition circuit 83 is simplified as much.

It is of course that the countermeasures against noise, as mentioned above, can be applied to the converter controller 14, since the converter unit 71 has quite the same circuit arrangement as the inverter unit 73. In this case, a DC voltage command is fed to the converter controller 14 from the speed controller 13, in place of the frequency command $f_c$ in FIG. 8. Further, a signal synchronizing with the voltage of the AC source 5 has to be used as the distribution signal. These modifications are obvious to one ordinarily skilled in the art.

As described above, this embodiment can prevent the transistors from being destroyed by the over-voltage caused by noise. Therefore, the reliable operation of the elevator system can be accomplished.

Although we have herein shown and described only some forms of apparatus embodying our invention, it is understood that further changes and modifications may be made therein within the scope of the appended claims without departing from the spirit and scope of our invention.

We claim:

1. An apparatus for controlling an AC elevator comprising:
    a converter unit for converting AC electric power to DC electric power, at the input end of which a capacitor is connected in parallel with an AC electric source, which supplies said converter unit with the AC electric power;
    an inverter unit for inverting the DC electric power converted in said converter unit into AC electric power, at the output end of which a capacitor is connected in parallel with an induction motor for driving an elevator cage;
    said inverter unit being constructed by a three phase bridge circuit of switching elements and control signals for switching elements of one phase are formed by the logical combination of control signals for switching elements of the remaining two phases;
    the control signal for a switching element of a positive arm of said one phase being formed by the inverse OR of the control signals for switching elements of positive arms of said remaining two phases and the control signal for switching element of a negative arm of said one phase is formed by the inverse OR of the control signals for switching element of negative arms of said remaining two phases;
    a DC reactor connected between said converter unit and said inverter unit; and
    means for controllling said converter unit and said inverter unit in response to signals produced in floors served by the elevator and in the elevator cage.

2. An apparatus for controlling an AC elevator comprising:
    a converter unit for converting AC electric power to DC electric power, at the input end of which a capacitor is connected in parallel with an AC electric source, which supplies said converter unit with the AC electric power;
    said converter unit being constructed by a three phase bridge circuit of switching elements and control signals for switching elements of one phase are formed by the logical combination of control signals for switching elements of the remaining two phases;
    an inverter unit for inverting the DC electric power converted in said converter unit into AC electric power, at the output end of which a capacitor is connected in parallel with an induction motor for driving an elevator cage;

a DC reactor connected between said converter unit and said inverter unit; and means for controlling said converter unit and said inverter unit in response to signals produced in floors served by the elevator and in the elevator cage.

3. An apparatus for controlling an AC elevator as defined in claim 2, wherein the control signal for a switching element of a positive arm of said one phase is formed by the inverse OR of the control signals for switching elements of positive arms of said remaining two phases and the control signal for a switching element of a negative arm of said one phase is formed by the inverse OR of the control signals for switching elements of negative arms of said remaining two phases.

4. An apparatus for controlling an AC elevator comprising:

a three phase induction motor for driving a cage of the elevator;

converter unit means for converting the AC electric power of said AC power source to DC electric power of variable voltage, the converter unit means including having the AC terminals thereof connected to the AC power source;

first capacitor means connected to the AC terminals of the three phase bridge of the converter unit means in parallel with the AC power source;

inverter unit means for inverting the DC electric power converted in the converter unit means to AC electric power of variable voltage and variable frequencies for supply to the induction motor, the inverter unit means including power transistors connected in a three phase bridge and having the AC terminals there of connected to the induction motor;

second capacitor means connected to the AC terminals of the three phase bridge of the inverter unit means in parallel with the induction motor;

a DC reactor connected between DC terminals of the three phase bridge of the converter unit means and DC terminals of the three phase bridge of the inverter unit means; and means for controlling signals supplied for bases of the power transistors of the converter unit means and the inverter unit means in accordance with signals produced in floors served by the elevator and in the elevator cage, said means for controlling signals for the bases of the power transistors of the inverter unit means including means for forming the control signals for the bases of the power transistors of one phase of the three phase bridge circuit by the logical combination of the control signals for the bases of the power transistors of the remaining two phases of the three phase bridge circuit.

5. An apparatus for controlling an AC elevator as defined in claim 4, wherein the control signal for a power transistor of a positive arm of the one phase is formed by the inverse OR of the the control signals for power transistors of positive arms of the remaining two phases, and the control signal for a power transistor of a negative arm of the one phase is formed by the inverse OR of the control signals for the power transistors of negative arms of the remaining two phases.

6. An apparatus for controlling an AC elevator comprising:

a three phase induction motor for driving a cage of the elevator;

converter unit means for converting the AC electric power of said AC power source to DC electric power of variable voltage, the converter unit means including power transistors connected in a three phase bridge and having the AC terminals thereof connected to the AC power source;

first capacitor means connected to the AC terminals of the three phase bridge of the converter unit means in parallel with the AC power source;

inverter unit means for inverting the DC electric power converted in the converter unit means to AC electric power of variable voltage and variable frequencies for supply to the induction motor, the inverter frequencies for supply to the induction motor, the inverter unit means including power transistors connected in a three phase bridge and having the AC terminals there of connected to the induction motor;

second capacitor means connected to the AC terminals of the three phase bridge of the inverter unit means in parallel with the induction motor;

a DC reactor connected between DC terminals of the three phase bridge of the converter unit means and DC terminals of the three phase bridge of the inverter unit means; and means for controlling signals supplied for bases of the power transistors of the converter unit means and the inverter unit means in accordance with signals produced in floors served by the elevator and in the elevator cage;

means for controlling signals supplied for bases of the power transistors of the converter unit means including means for forming control signals for the bases of the power transistors of one phase of the three phase bridge circuit by the logical combination of the control signals for the bases of the power transistors of the remaining two phases of the three phase bridge circuit.

7. An apparatus for controlling an AC elevator as defined in claim 6, wherein the control signal for a power transistor of a positive arm of the one phase is formed by the inverse OR of the control signals for power transistors of positive arms of the remaining two phases, and the control signal for a power transistor of a negative arm of the one phase is formed by the inverse OR of the control signals for the power transistors of negative arms of the remaining two phases.

* * * * *